UNITED STATES PATENT OFFICE.

ELISHA B. CUTTEN, OF ERIE, PENNSYLVANIA.

PROCESS OF MAKING ZINC-WHITE.

1,109,113. Specification of Letters Patent. Patented Sept. 1, 1914.

No Drawing. Application filed September 15, 1913. Serial No. 789,842.

*To all whom it may concern:*

Be it known that I, ELISHA B. CUTTEN, a citizen of the United States, residing at Erie, county of Erie, and State of Pennsylvania, have invented a certain new and useful Process of Making Zinc-White, of which the following is a specification.

My invention relates to processes of obtaining zinc white directly from ores and especially to processes of obtaining it from ores in the wet way.

The ores to which it is intended to apply my process are those in which the zinc occurs as a sulfid or carbonate, more generally the former.

In carrying out my process on sulfid ores I proceed as follows: The ore is first crushed to the proper degree of fineness and roasted with free access of air in any desired roaster until the contained metals are fully oxidized. The sulfurous oxid ($SO_2$) formed during the roasting may be withdrawn from the roaster and converted into sulfuric acid in any well known way. The ore containing zinc and other metals in the form of oxids is then withdrawn from the roaster and allowed to become cold. After the ore has become cold, I treat it with dilute cold sulfuric acid. The acid for this may be that obtained from the roasting of the sulfid ore. The sulfuric acid employed should be just sufficient in quantity to satisfy the zinc contained in the ore, as may be determined by analysis, and should be applied in a very dilute and cold state. These conditions are of importance since I have found that if the acid be applied cold and dilute, the sulfate formed will be almost solely that of zinc, whereas if hot acid be employed sulfates of other contained metals will be formed which will appear as impurities in the product. If it is found that the temperature of the mixture rises materially on the addition of the acid it should be applied more gradually, this rise in temperature being due to the heat of formation of the zinc sulfate. The mixture is then allowed to stand until all of the heat produced by the reaction shall have passed off. During this period it is found that if any sulfates other than zinc have formed due to a rise in temperature and if the sulfuric acid be properly proportioned, such sulfates are decomposed probably by a reaction of some remaining zinc oxid. After the mixture has become cool, the solution is separated from the solid matter in any usual or desired way, and the solution will be found to be a solution of zinc sulfate substantially free from other bodies. If a greater freedom from impurities, such as traces of iron, etc., is desired, it may be obtained by crystallization and resolution in the well known manner, or in any manner known to those skilled in the art. Having now obtained a solution of substantially pure zinc sulfate it remains to obtain therefrom zinc white and this I do by adding to the above solution ammonia as a gas or liquid or ammonium hydrate, the effect of this addition being the precipitation of the zinc as a hydrated oxid. The precipitate being separated from the solution in any well known way, as for instance by means of a filter press, may be dried and ground and placed on the market for use as such as a pigment or in any of the well known mixtures. The solution containing ammonium sulfate may be treated by well known methods for the recovery of ammonia therefrom and one of the advantages of the use of ammonia or ammonium hydrate as the precipitant is the easy and economical recovery of the ammonia for reuse.

As above stated the process may be employed on ores containing carbonates and without change except that the preliminary roasting is omitted. It will also be obvious that hydrochloric acid may be substituted for the sulfuric acid, and if the conditions above prescribed are followed, it will be found satisfactory, but the former acid will generally be preferred.

Ammonium carbonate may be employed as the precipitant if zinc carbonate is desired as the product, but the zinc hydrate is more desirable as it is a better carrier of oil.

In the claims I have specified the use of a compound of ammonium, but it will be understood that I contemplate the use of ammonium or ammonia in other equivalent forms suitable for the purpose specified.

As heretofore stated, the ore on which my process is practised contains zinc and other metals in the form of oxids. These other metals are usually copper, iron and lead to which zinc is electropositive. All of these metals are converted into oxids by the roasting step and these oxids are treated gradually with a suitable water soluble acid, such as sulfuric acid, and a low temperature is maintained during such treatment. By such treatment the acid ions are caused to attack mainly the zinc oxids and the treatment is continued until enough acid has been added to just about use up the zinc. The fluid containing the dissolved zinc salt is then taken away and is treated with a suitable precipitating agent to obtain the zinc as an oxid or hydrate or both in the form of zinc white.

I claim:

1. The herein described process of obtaining pigment which consists in treating a compound, containing a mixture of oxids including zinc oxid, slowly with a dilute solution of a suitable water-soluble acid, maintaining the temperature low during such treatment, whereby the acid ions attack mainly the zinc oxid, continuing the treatment until enough acid has been added to just about use up the zinc, taking away the fluid containing the dissolved zinc salt, and obtaining zinc therefrom as zinc oxid or hydrate or both.

2. The herein described process of obtaining pigment, which consists in converting zinc and any associated metals to which zinc is electro-positive in zinkiferous compounds, into oxids, crushing, treating slowly said compounds with a suitable water soluble acid, maintaining the temperature low during such treatment, whereby the acid ions attack mainly the zinc oxid, continuing the treatment until enough acid has been added to just about use up the zinc, taking away the fluid containing the dissolved zinc salt, and treating said zinc salt solution with a suitable precipitating agent to obtain zinc white, substantially as described.

3. The herein described process of obtaining pigment, which consists in converting zinc and any associated metals to which zinc is electro-positive in zinkiferous compounds, into oxids, crushing, treating slowly said compounds with a suitable water soluble acid, maintaining the temperature low during such treatment, whereby the acid ions attack mainly the zinc oxid, continuing the treatment until enough acid has been added to just about use up the zinc, taking away the fluid containing the dissolved zinc salt, maintaining the fluid at a low temperature and in a state of quiescence, and precipitating the zinc therefrom as oxid by treating said solution with ammonia, substantially as described.

In testimony whereof I have hereunto subscribed my name.

ELISHA B. CUTTEN.

Witnesses:
LLOYD B. WIGHT,
A. N. MITCHELL.